United States Patent
Katayama et al.

(10) Patent No.: US 7,814,670 B2
(45) Date of Patent: Oct. 19, 2010

(54) LASER LEVEL DETECTION SYSTEM

(75) Inventors: Yasutaka Katayama, Tokyo (JP); Kunihiro Hayashi, Tokyo (JP); Takaaki Yamazaki, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 955 days.

(21) Appl. No.: 11/526,721

(22) Filed: Sep. 26, 2006

(65) Prior Publication Data
US 2007/0076188 A1    Apr. 5, 2007

(30) Foreign Application Priority Data
Sep. 30, 2005    (JP) .............................. 2005-288396

(51) Int. Cl.
*G01C 5/00*    (2006.01)
*E02F 9/26*    (2006.01)

(52) U.S. Cl. ............................. 33/277; 33/293; 172/4.5

(58) Field of Classification Search .................. 33/1 CC, 33/276, 277, 278, 279, 280, 293, 294, 624; 356/139.01, 139.03, 139.1, 141.1, 141.3; 172/4.5; 701/50
See application file for complete search history.

(56) References Cited

U.S. PATENT DOCUMENTS

| | | | |
|---|---|---|---|
| 4,653,910 A | 3/1987 | Poling | |
| 4,820,041 A | 4/1989 | Davidson et al. | |
| 5,742,069 A | 4/1998 | Steenwyk et al. | |
| 5,951,612 A * | 9/1999 | Sahm | 701/50 |
| 6,480,264 B1 * | 11/2002 | Kimura et al. | 356/3.04 |
| 6,665,067 B2 * | 12/2003 | Ogawa et al. | 356/247 |
| 7,081,606 B2 * | 7/2006 | Osaragi et al. | 250/206.1 |
| 7,245,999 B2 * | 7/2007 | Dietsch et al. | 701/50 |
| RE39,834 E * | 9/2007 | Kieranen et al. | 404/84.5 |
| 7,307,710 B2 * | 12/2007 | Gatsios et al. | 356/139.01 |
| 7,398,137 B2 * | 7/2008 | Ferguson et al. | 700/275 |
| 2003/0137658 A1 * | 7/2003 | Ohtomo et al. | 356/141.4 |
| 2008/0047170 A1 * | 2/2008 | Nichols | 37/348 |

FOREIGN PATENT DOCUMENTS

| | | |
|---|---|---|
| EP | 1 061 185 A2 | 12/2000 |
| JP | 09-257472 A | 10/1997 |
| JP | 11063991 A * | 3/1999 |

* cited by examiner

*Primary Examiner*—R. A. Smith
(74) *Attorney, Agent, or Firm*—Foley & Lardner LLP

(57) ABSTRACT

A laser level detection system which detects a reference plane of laser at an arbitrary position includes a plurality of level detection units and an operation unit which displays a detection result of each of the level detection units and can operate each of the level detection units, and the laser level detection unit, which has detected the reference plane of the laser, outputs the detection result and an own identification signal of the level detection unit, and the operation unit displays the detection result and a receiving result of the identification signal of the level detection unit.

7 Claims, 8 Drawing Sheets

LASER LEVEL DETECTION SYSTEM

BACKGROUND

The present invention relates to a laser level detection system that a level detection device is attached to a bucket of a construction vehicle such as a shovel car, so as to detect criterial laser light by the level detection device, and display the information of the level detection device onto a display device disposed in the operating room of the construction vehicle.

There has been known a laser light detection and operation device for a construction machine that a level sensor is attached to a pole extending upward from a blade of bulldozer, so as to receive laser light of a rotation laser device with the level sensor, and display the difference from the appropriate height onto a remote display based on the light-receiving position of level sensor (reference to JP-H09-257472A).

In the above laser light detection and operation device for a construction machine, the height from a ground of a predetermined place to the reference plane of rotation laser device is interrelated with the height from the edge of blade to the light-receiving section, so ground leveling as planed can be performed if a land forming operation is performed to receive the laser light at a predetermined height position of the light-receiving section of level sensor.

However, in the laser light detection and operation device for a construction machine, if there is a plurality of ground leveling places, each having a different height position, the attachment position of level sensor (level detection device) has to be changed in accordance with each of the ground leveling places. Accordingly, it is very onerous to change the attachment position of the level sensor.

SUMMARY

Therefore, the present invention has been made in view of the aforementioned circumstance, and an object of the present invention is to provide a laser level detection system no need to change an attachment position of a laser level detection device when leveling a plurality of places, each having different height.

In order to achieve the above object, a first aspect of the present invention is directed to a laser level detection system which detects a reference plane of laser at an arbitrary position, comprising: a plurality of level detection units; and an operation unit which displays a detection result of each of the level detection units and can operate each of the level detection units, wherein the laser level detection unit, which has detected the reference plane of the laser, outputs the detection result and an own identification signal of the level detection unit, and wherein the operation unit displays the detection result and a receiving result of the identification signal of the level detection unit.

The following (1) to (5) are preferred embodiments of the laser level detection system according to the present invention. Any combinations of (1) to (5) are also preferred embodiments of the laser level detection system according to the present invention, unless any contradiction occurs.

(1) Any one of the plurality of level detection units is selected by the operation unit, and the operation unit displays the detection result and the receiving result of the selected laser level detection unit.

(2) The plurality of laser level detection units is disposed in an up and down direction.

(3) The level detection unit disposed in a site which requires the detection result is selected by the operation unit, and the operation unit displays the detection result and the receiving result of the selected level detection unit.

(4) The plurality of level detection units and the operation unit are the same units, each having the same function and a display section, when the unit is set to master by master/slave switching operation, the unit can be used as the operation unit, and the unit is set to slave by the master/slave switching operation, the unit can be used as the level detection unit.

(5) When at least two units are set to the master by the master/slave switching operation, each of the units can be switched to a mode which only displays the detection result or a mode which has an operation function and displays the detection result.

According to the present invention, it is not necessary to change an attachment position of laser level detection device when leveling a plurality of lands each having different height.

DESCRIPTION OF THE PREFERRED EMBODIMENTS

Reference will now be made in detail to the present preferred embodiments of the invention, examples of which are illustrated in the accompanying drawings. The scope of the present invention, however, is not limited to these embodiments. Within the scope of the present invention, any structure and material described below can be appropriately modified.

First Embodiment

Figure 1:
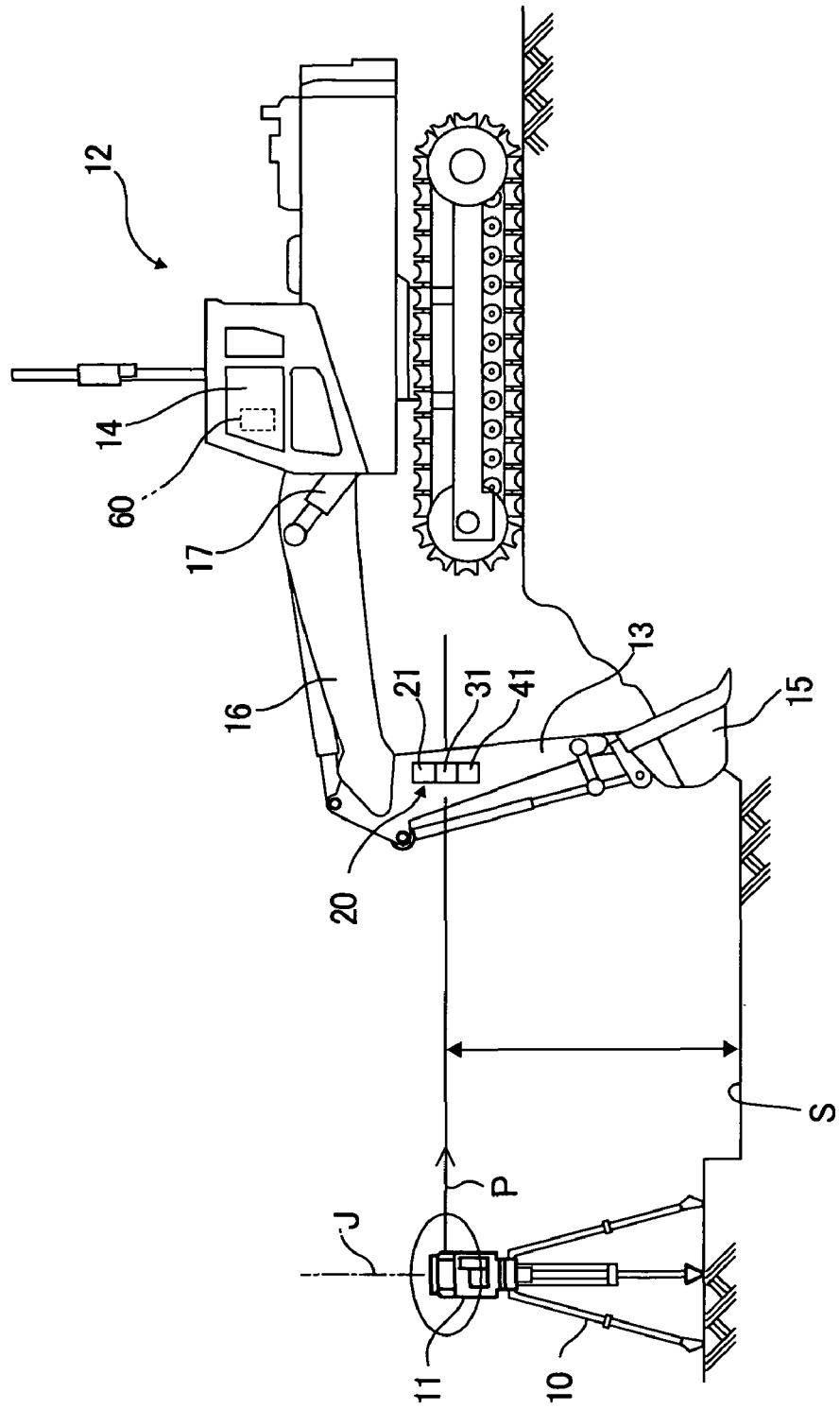
FIG. 1 is an explanation view showing a structure of laser level detection system according to the present invention.

FIG. 1 shows a laser level detection system. The laser level detection system comprises a rotation laser device 11 disposed in a predetermined position of land forming ground via a tripod 10, a level detection device 20 attached to an arm 13 of a hydraulic shovel car (construction vehicle) 12 and an operation unit (operation unit for remote operation) 60 disposed in an operating room 14 of the hydraulic shovel car 12. A bucket (work device) 15 is swingablly mounted on the leading end of the arm 13 of the hydraulic shovel car 12, and the arm 13 is mounted on a leading end portion of a boom 16. If a boom cylinder 17 and an arm cylinder (not shown) are driven, the boom 16 and the arm 13 operate to move the bucket 15 up and down and back and forth, and if a bucket cylinder (not shown) is driven, the bucket 15 swings.

The rotation laser device 11 emits laser light P, and rotates the laser light P about a vertical axis line J to form a reference plane.

Figure 2:
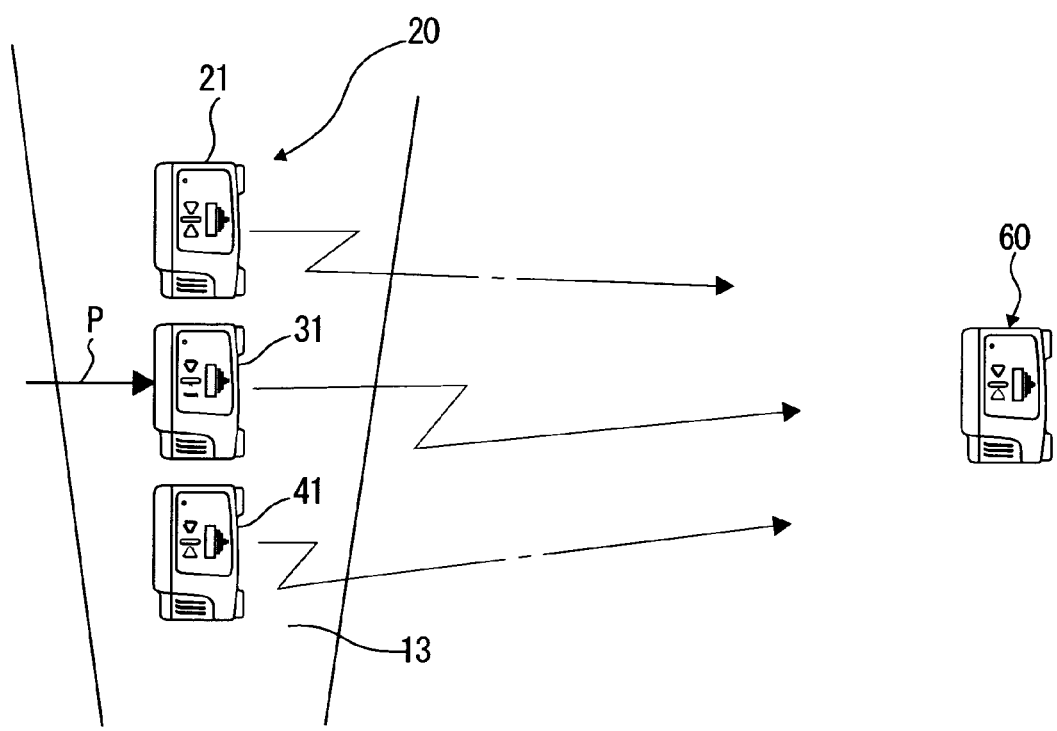
FIG. 2 is an explanation view illustrating a structure of level detection unit of the laser level detection system shown in FIG. 1.
Figure 3:
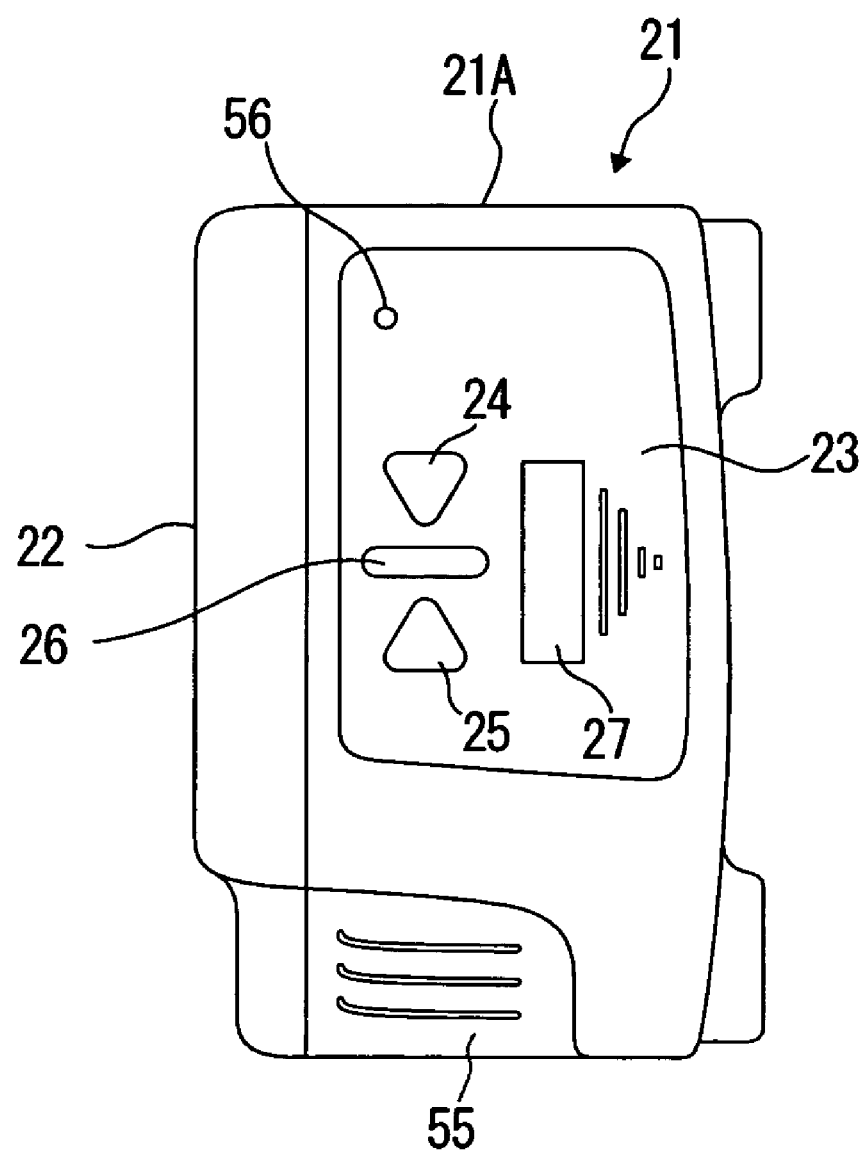
FIG. 3 is a front view illustrating the outer appearance of level detection unit.

The level detection device 20 comprises three level detection units 21, 31, 41 as shown in FIG. 2. These three level detection units 21, 31, 41 are detachably attached by a magnet along the longitudinal direction of the arm 13.

The level detection unit 21 is provided with a light-receiving section 22 for receiving the laser light P disposed in one side surface of a body 21A along the up and down direction thereof. The front surface of the body 21A is provided with a display section 23. The display section 23 is provided with a light-emitting diode 24 which indicates downside when the site (position) of light-receiving section 22 for receiving the laser light P is above the central position (reference position), a light-receiving diode 25 which indicates upside when the site is below the central position (reference position), a light-emitting diode 26 which displays that the site (position) of light-receiving section 22 for receiving the laser light P is the central position, and a liquid crystal display portion 27 which analog-displays the difference between the site of light-receiving section 22 for receiving the laser light P and the central position.

Other level detection units 31, 41 have the same structure as the level detection unit 21; thus, the explanation thereof is omitted.

Figure 4:
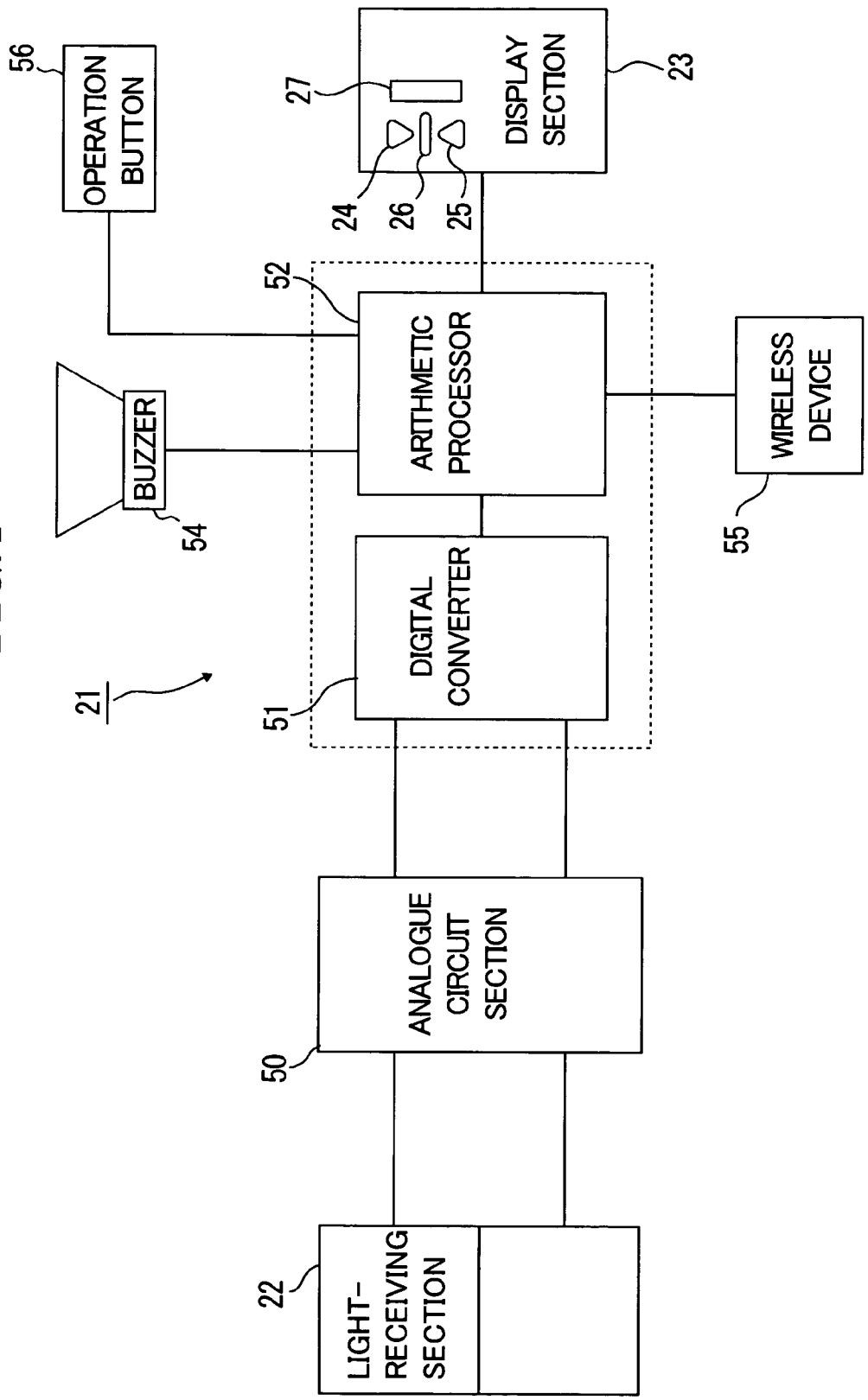
FIG. 4 is a block diagram showing a structure of signal processing system of the level detection unit of FIG. 3.

FIG. 4 is a block diagram showing a structure of signal processing system of the level detection unit 21. The light-receiving section 22 comprises a light-receiving element group that N-light receiving elements such as photodiode are disposed upward and downward at a predetermined interval. The light-receiving signal of each of the light-receiving elements is amplified by an analog circuit section 50 for each of the light-receiving elements. Reference number 51 denotes a digital converter which converts the light-receiving signal amplified by the analogue circuit section into a digital signal, and reference number 52 denotes an arithmetic processor which obtains the difference between the position of light-receiving element (site of light-receiving section 22) positioned in the central position of the laser light (central position of beam) received by the light-receiving section 22, and the central position of the light-receiving section 22 (reference position), based on the digital signal of each of the light-receiving elements converted by the digital converter.

The arithmetic processor 52 illuminates the light-emitting diodes 24-26 corresponding to the difference between the central position of laser light P and the reference position, displays onto the liquid crystal portion 27 the analog display according to the difference, and also sounds a buzzer 54 corresponding to the difference.

Reference number 55 is a wireless device which wirelessly sends the data of the difference calculated by the arithmetic processor 52 and an ID code to the operation unit 60, and also receives a signal from the operation unit 60. Reference number 56 is an operation button which changes accuracy for obtaining the central position of the laser light, and also changes the reference position.

The signal processing system of other level detection units 31, 41 is the same as the level detection unit 21; thus, the explanation thereof is omitted.

Figure 5:
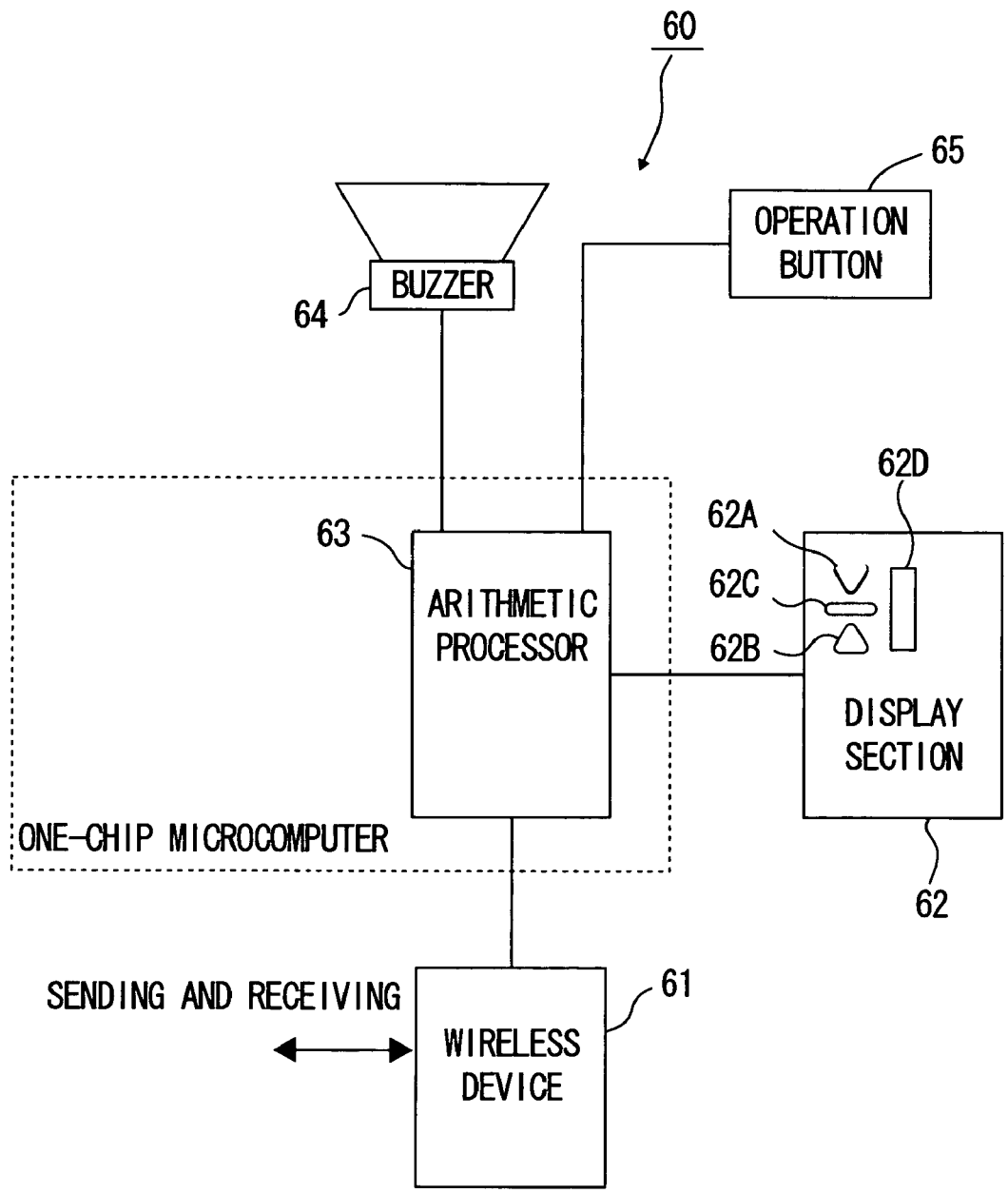
FIG. 5 is a block diagram showing a structure of signal processing system of an operation unit.

FIG. 5 is a block diagram illustrating a structure of signal processing system of the operation unit 60. Reference number 61 denotes a wireless device which performs sending and receiving with the wireless device 55 of each of the level detection units 21, 31, 41. Reference number 62 denotes a display section which displays the difference calculated by the arithmetic processor 52 of each of the level detection units 21, 31, 41. The display section 62 similar to the display section of the level detection unit 21 comprises a light-emitting diode 62A which indicates downside, a light-emitting diode 62B which indicate upside, a light-emitting diode 62C which displays that the light-receiving position of laser light P is the central position, and a liquid crystal display portion 62D which displays the difference between the light-receiving position for receiving the laser light P and the central position.

Reference number 63 denotes an arithmetic processor which controls the displaying of the display section 62 and sounds a buzzer 46, based on the data received by the wireless device 61. Reference number 65 denotes an operation button which changes accuracy for obtaining the central position of the laser light of each of the level detection devices 21, 31, 41.

In addition, a desired level detection unit 21, 31 or 41 can be powered off or can be switched to a power-saving mode by the operation of the operation button 65.

In this embodiment, a level detection unit having the same structure as the level detection unit 21 is used as the operation unit 60. A maser/slave switch (not show) is provided in the level detection unit. If the level detection unit is set as master by the master/slave switch, the level detection unit functions as the operation unit. Also, if the level detection device is set as slave, the level detection unit functions as the level detection unit.

In addition, a mode switch (not shown) is provided. When the master is set, a display mode for displaying only the above difference onto the display section 62 and an operation mode are switchable by the operation of the mode switch. The operation mode can conduct the operation by the operation button and has a function which displays the above difference onto the display section 62.

In this case, the operation unit is set to the operation mode.

[Operation]

Next, the operation of laser level detection system having the above structure is explained.

At first, the rotation laser device 11 is positioned in a predetermined position of land forming ground via the tripod 10 as shown in FIG. 1. The rotation laser device 11 emits the laser light P and rotates the laser light P about the vertical axis line J to form a reference plane.

Next, the level detection unit 21 is attached to the arm 13 of the hydraulic shovel car 12 such that the laser light is illuminated onto the reference position (central position) of the light-receiving section 22 of the level detection unit 21, while bringing the blade of bucket 15 of the hydraulic shovel car 12 into contact with a ground S of operation depth. In this case, a part of ground S is previously measured and dug at predetermined depth.

The level detection unit 21 is attached by a strong magnet (not shown) disposed in the body 21A.

By the way, in case of improving a road, the height of road shoulder and the height of road surface are different, respectively, and it is necessary to control these height. Accordingly, the level detection units 21, 31, 41 are attached according to these height.

Figure 6:
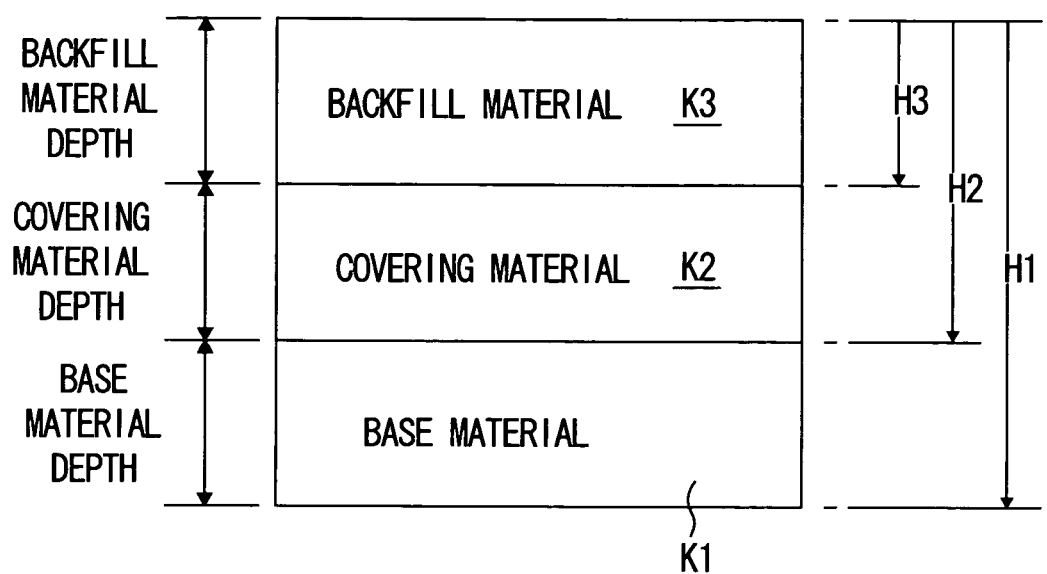
FIG. 6 is a schematic diagram showing when paving a base material, covering material and backfill material on a bulldozed ground.

For example, as shown in FIG. 6, when performing the operation for each of a base material K1 such as gravel, a covering material K2 such as sand covered for disposing a clay pipe or the like, and a backfill material K3 such as soil, each of the level detection units 21, 31, 41 is attached as described above corresponding to each of the depths. For example, the reference position of the level detection unit 21 is matched with the depth H1 of the base material K1 to attach the level detection unit 21 to the arm 13 of the hydraulic shovel car 12, the reference position of the level detection unit 31 is matched with the depth H2 of covering member K2 to attach the level detection unit 31 to the arm 13 of the hydraulic shovel car 12, and the reference position of level detection unit 41 is matched with the depth H3 of the backfill material K3 to attach the level detection unit 41 to the arm 13 of the hydraulic shovel car 12.

In this case, materials having the same height as the base material K1 and the covering material K2, respectively, are previously prepared, these materials are positioned onto the ground S to bring the blade of the bucket 15 into contact with the material, and the level detection units 31, 41 are attached as described above.

Next, an operator selects the level detection unit 21 by operating the operation button 65 of the operation unit 60. By this selection, the operation unit 60 receives only the data sent from the level detection unit 21.

In addition, each of the unused level detection units 31, 41 is powered off or switched to the power-saving mode by operating the operation button 65 of the operation unit 60. Thereby, the buttery drain of the level detection units 31, 41 can be minimized; thus, the interruption of operation by changing the buttery can be reduced as much as possible.

If the light-receiving section 22 receives the laser light P emitted from the rotation laser device 11, the level detection unit 21 wirelessly sends to the operation unit 60 the data of the difference between the position of light-receiving element of the light-receiving section 22, which is the central position of the laser light P, and the reference position of right-receiving section 22, and the ID code of the level detection unit 21.

If the wireless device 61 receives the data sent from the level detection unit 21, the operation unit 60 controls the display of the display section 62 based on the received data, i.e., the difference between the light receiving position of the light-receiving section 22 of the level detection unit 21 and the reference position of the light-receiving section 22. For example, if the position of light-receiving section 22 for receiving the laser light P is above the reference position of the light-receiving section 22, the light-emitting diode 62A of operation unit 60 which indicates downside lights up.

Similarly, if the position of light-receiving section 22 for receiving the laser light P is below the reference position of light-receiving section 22, the light-emitting diode 62B of the operation unit 60 which indicates upside lights up, and if the position of light-receiving section 22 for receiving the laser light P is the reference position, the light-emitting diode 62C lights up. The difference between the light-receiving position for receiving the laser light P and the reference position is analogue-displayed onto the liquid crystal display section 62D.

The operator observes the display section 62 of the operation unit 60 to recognize predetermined depth H1 for digging in the ground. Therefore, the ground can be absolutely bulldozed at predetermined height.

Next, when paving the base material K1, the operator operates the operation button 65 of the operation unit 60 to select the level detection unit 31. By this selection, the operation unit 60 receives only the data sent from the level detection unit 31. As described above, the operator observes the display section 62 of the operation unit 60 to recognize predetermined depth H2 for paving the base material K1. Accordingly the base material K1 can be paved to the predetermined depth H2. In addition, when paving the covering material K2, the operator operates the operation button 65 of operation unit 60 to select the level detection unit 41 as described above, and the operator observes the display section 62 of the operation unit 60 to recognize predetermined depth H3 for paving the covering material K2. Accordingly, the covering material K2 can be paved to the predetermined depth H3.

As just described, the operator can control a plurality of height by observing the display section 62 of the display unit 60. Therefore, it is not necessary for the operator to change the height of rotation laser device 11 and the attachment height of level detection units 21, 31, 41. Thus, the operation time can be significantly reduced.

In the present embodiment, the sending and receiving between the level detection units 21, 31, 41 and the operation unit 60 is conducted by wireless communication; thus, multiplex communication can be performed. Accordingly, the accuracy for obtaining the central position of laser light can be changed and also the mode of each of the level detection units 21, 31, 41 for changing the reference position can be changed in a short time.

Moreover, four same units can be used as the level detection units 21, 31, 41 and the operation unit 60 by the switching operation of the master/slave switch; thus, the laser level detection system can be constructed with a lower price.

Second Embodiment

Figure 7:
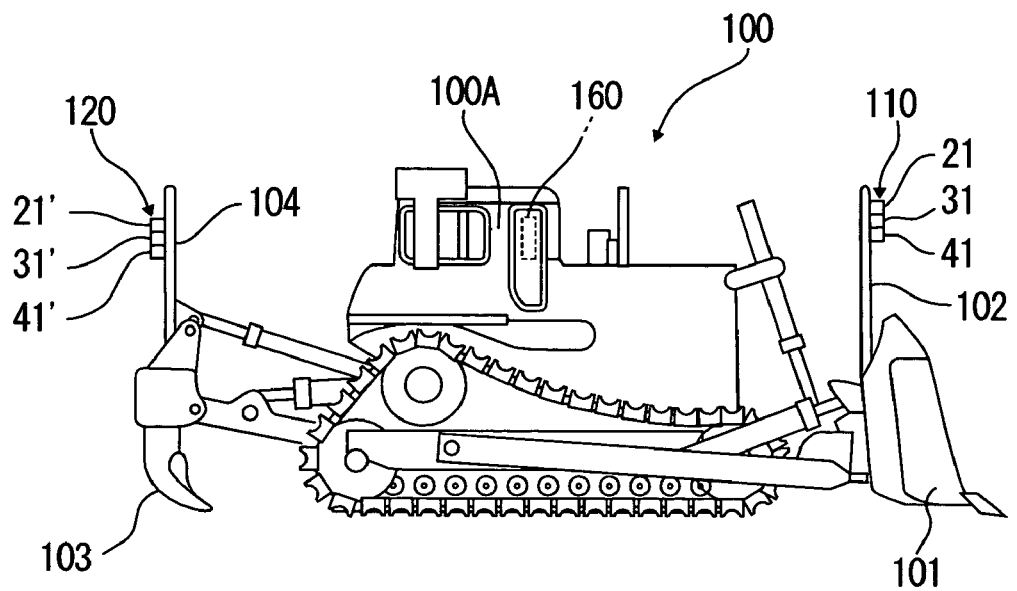
FIG. 7 is an explanation view showing a bulldozer of a second embodiment.

FIG. 7 shows a second embodiment. In the second embodiment, a first level detection device 110 is provided in a pole 102 disposed in a blade (work device) 101 of a bulldozer (construction vehicle) 100, and a second level detection device 120 is provided in a pole 104 disposed in a ripper (work device) 103 of the bulldozer 100. The first level detection device 110 comprises the level detection units 21, 31, 41 similar to the first embodiment, and the second level detection device 120 comprises level detection units 21', 31', 41'. The level detection units 21, 31, 31 are disposed along the longitudinal direction of the pole 102, and the level detection units 21', 31', 41' are disposed along the longitudinal direction of the pole 104. An operation unit 160 having the same structure as the operation unit 60 is disposed in an operating room 100A of the bulldozer 100. The operation button (not shown) of the operation unit 160 is operated to select one of the first and second level detection devices 110, 120 according to the operation of the blade 101 or the ripper 103. One of the level detection units 21, 31, 41 of the selected first level detection device 110, for example, or one of the level detection units 21', 31', 41' of the second level detection device 120 is selected.

The difference between the light-receiving position of light-receiving section of the selected laser level detection unit and the reference position of light-receiving section is displayed on the operation unit 160. Thereby, sand and rock can be scraped by the ripper 103 at predetermined height and also the ground can be bulldozed by the blade 101 at predetermined height.

Conventionally, the ground leveling was risky because it was necessary to confirm the front of traveling direction while confirming the height of ripper 103 disposed backward. However, according to the second embodiment, since the height of ripper 103 is displayed on the operation unit 160, the height of ripper 103 can be confirmed while observing ahead. Therefore, the ground leveling can be safely performed.

In the present embodiment, the first and second level detection devices 110, 120 comprise three level detection units 21, 31, 41, 21', 31', 41', respectively. However, the first and second level detection devices may comprise one level detection unit, respectively.

Third Embodiment

Figure 8:
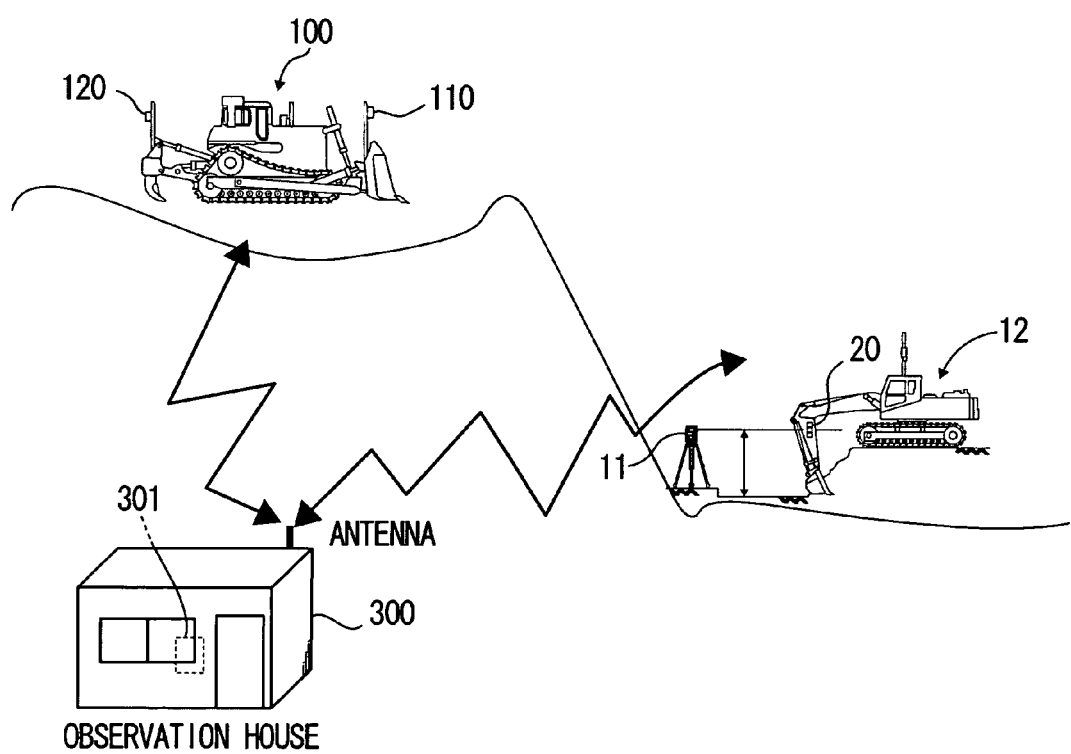
FIG. 8 is an explanation view illustrating a structure of laser level detection system of a third embodiment.

FIG. 8 shows a structure of laser level detection system according to a third embodiment. In the third embodiment, an operation unit 301 similar to the operation unit 60 of the first embodiment is disposed in an observation house 300. The operation unit 301 displays on a display section (not shown) the difference between the light-receiving position of light-receiving section of the level detection unit of the each of the level detection devices 20, 110, 120 and the reference position of light-receiving section by the wireless sending and receiving between the operation unit 60 of the hydraulic shovel car 12 (reference to FIG. 1) and the operation unit 160 of bulldozer 100 (reference to FIG. 7). Therefore, the progress in each of the operation sites can be monitored in a remote place.

If the master is set by a master/slave switch (not show), and a display mode is set by a mode switch (not show), the operation unit 301 displays the difference onto a display section (not shown) of the operation unit 301.

In the above embodiments, each of the level detection devices 20, 110, 120 comprises three level detection units. As long as a plurality of units is used for each of the level detection devices, the number of level detection units is not limited three.

Although the present invention has been described in terms of exemplary embodiments, it is not limited thereto. It should be appreciated that variations may be made in the embodiments described by persons skilled in the art without departing from the scope of the present invention as defined by the following claims.

The present application is based on and claims priority from Japanese Patent Application Serial No. 2005-288396, filed Sep. 30, 2005, the disclosure of which is hereby incorporated by reference herein in its entirety.

What is claimed is:

1. A laser level detection system which detects a reference plane of a laser at an arbitrary position, comprising:
a plurality of level detection units; and
an operation unit which displays a detection result of each of the level detection units and can operate each of the level detection units, wherein the laser level detection unit, which has detected the reference plane of the laser, outputs the detection result and an identification signal identifying the level detection unit,
wherein the operation unit displays the detection result and a receiving result of the identification signal of the level detection unit, and
the plurality of level detection units is detachably attached to a construction machine along an up and down direction.

2. The laser level detection system according to claim 1,
wherein any one of the plurality of level detection units is selected by the operation unit, and
wherein the operation unit displays the detection result and the receiving result of the selected laser level detection unit.

3. The laser level detection system according to claim 1,
wherein the plurality of level detection units and the operation unit are the same units, each having the same function and a display section,
wherein when the unit is set to master by master/slave switching operation, the unit can be used as the operation unit, and
wherein when the unit is set to slave by the master/slave switching operation, the unit can be used as the level detection unit.

4. The laser level detection system according to claim 3, wherein when at least two of the units are set to the master by the master/slave switching operation, each of the units can be switched to a mode which only displays the detection result or a mode which has an operation function and displays the detection result.

5. The laser level detection system according to claim 1, wherein the plurality of level detection units is detachable attached to the construction machine by a magnet.

6. A laser level detection system which detects a reference plane of a laser at an arbitrary position, comprising:
a plurality of level detection units; and
an operation unit which displays a detection result of each of the level detection units and can operate each of the level detection units, wherein the laser level detection unit, which has detected the reference plane of the laser, outputs the detection result and an identification signal identifying the level detection unit,
wherein the operation unit displays the detection result and a receiving result of the identification signal of the level detection unit,
wherein the plurality of level detection units and the operation unit are the same units, each having the same function and a display section,
wherein when the unit is set to master by master/slave switching operation, the unit can be used as the operation unit, and
wherein when the unit is set to slave by the master/slave switching operation, the unit can be used as the level detection unit.

7. The laser level detection system according to claim 6, wherein when at least two of the units are set to the master by the master/slave switching operation, each of the units can be switched to a mode which only displays the detection result or a mode which has an operation function and displays the detection result.

* * * * *